United States Patent
Yokoyama et al.

[19]

[11] Patent Number: 5,952,750

[45] Date of Patent: Sep. 14, 1999

[54] ELECTROMAGNETIC SPRING CLUTCH WITH NON-MAGNETIC ROTATING MEMBERS

[75] Inventors: Yasuo Yokoyama; Toshiaki Akashi, both of Kiryu, Japan

[73] Assignee: Ogura Clutch Co Ltd., Gunma, Japan

[21] Appl. No.: 09/124,790

[22] Filed: Jul. 30, 1998

[30] Foreign Application Priority Data

Jul. 31, 1997 [JP] Japan .................................. 9-220947

[51] Int. Cl.⁶ .................................................. H02K 7/10
[52] U.S. Cl. ........................................ 310/78; 192/12 D
[58] Field of Search ................................ 310/78; 192/35, 192/84.81, 18 B, 12 D

[56] References Cited

U.S. PATENT DOCUMENTS

| | | | |
|---|---|---|---|
| 3,934,690 | 1/1976 | Janning | 192/84.81 |
| 3,974,902 | 8/1976 | Wahlstedt et al. | 192/84.81 |
| 4,159,048 | 6/1979 | Baxter et al. | 192/12 BA |
| 4,263,995 | 4/1981 | Wahlstedt | 192/35 |
| 4,321,992 | 3/1982 | Gallo | 192/81 C |
| 4,465,171 | 8/1984 | Koyama | 192/84.81 |
| 4,846,324 | 7/1989 | Ohsawa | 508/373 |
| 5,031,744 | 7/1991 | Nishimura | 192/81 C |
| 5,031,745 | 7/1991 | Nishimura | 192/84.81 |
| 5,090,538 | 2/1992 | Osawa | 192/84.81 |
| 5,099,974 | 3/1992 | Spechko | 192/84.81 |
| 5,127,502 | 7/1992 | Billings | 192/35 |
| 5,133,437 | 7/1992 | Larson | 192/12 BA |
| 5,687,822 | 11/1997 | Arai | 192/84.81 |

FOREIGN PATENT DOCUMENTS

| | | | |
|---|---|---|---|
| 63-293327 | 11/1988 | Japan | F16D 27/10 |
| 63-293328 | 11/1988 | Japan | F16D 27/10 |
| 63-187729 | 12/1988 | Japan | F16D 27/10 |
| 6-24239 | 3/1994 | Japan | F16D 27/105 |

*Primary Examiner*—Thomas M. Dougherty
*Assistant Examiner*—Joseph Waks
*Attorney, Agent, or Firm*—Sidley & Austin; Hugh A. Abrams

[57] ABSTRACT

A compact, inexpensive electromagnetic spring clutch includes forming supporting bearing surfaces made of synthetic resin rotary members, in a magnetic excitor. Cylindrical magnetic pole parts are formed in the first core and second core and the inner surfaces of these magnetic pole parts are made into bearing surfaces.

6 Claims, 9 Drawing Sheets

ELECTROMAGNETIC SPRING CLUTCH WITH NON-MAGNETIC ROTATING MEMBERS

BACKGROUND OF THE INVENTION

This invention relates to an electromagnetic spring clutch built into the paper feeding mechanism of a copying machine, or similar device.

The conventional electromagnetic spring clutch of the prior art includes first and second rotary members, both of which are formed of nonmagnetic materials. The first rotary member is placed around a shaft and held by a pair of snap rings. The second rotary member is placed over a portion of the first rotary member. That portion of the first rotary member is referred to as the cylindrical first bearing part, which is integrally formed in the first rotary member. The first and second rotary members rotate together by the tensioning or winding-up of a coil spring that is placed or fitted between portions of the first and second rotary members. The generation of magnetic flux which is caused by energization of a coil, causes a cylindrical armature to tension the spring.

An electromagnetic spring clutch of such construction is shown in Japanese Laid Open Utility Model No. 6-24239. The clutch fits around a shaft at a point at which the shaft is noncylindrical. A stepped outer peripheral surface is provided along a first rotary member. The second rotary member is placed along the outer peripheral surface of the first rotary member at a location called the cylindrical first bearing part. The first rotary member includes a cylindrical spring wind-up part or portion, which extends upwardly from the first rotary member with an outer diameter that is larger than that of the first bearing part of the first rotary member. The first rotary member also includes a cylindrical second bearing part, the outer diameter of which is larger than that of the first bearing part; and, a cylindrical third bearing part of the same outer diameter as that of the said first bearing part. The first rotary member is made of a nonmagnetic synthetic resin.

The second rotary member has a center hole which fits around the first bearing part of the first rotary member. Provided on the outer peripheral surface of the second rotary part is a cylindrical spring wind-up part of nearly the same outer diameter as that of the spring wind-up part of the first rotary member; a cylindrical fourth bearing part of same outer diameter as that of the second bearing part of the first rotary member; and, a gear part of larger outer diameter than that of the fourth bearing part.

A coil spring, one end of which is engaged to second rotary member, is fitted or placed between the spring wind-up parts of the first and second rotary members. A cylindrical armature is also placed around the spring and between the spring wind-up parts of the first and second rotary members. The armature has an open end at one end that engages the coil spring. The armature also is rotatably fitted (concentrically) around the shaft and rotary members along the fourth bearing part of the second rotary member and the second bearing part of the first rotary member.

In addition, a magnetic excitor or electrical winding is supported on the third bearing part of the first rotary member. The magnetic excitor has an annular first core of L-shaped cross section. A circular plate second core is fixedly attached to the open end of the first core. A bearing member with a boss part is fitted to the center hole formed in the circular plate part of the first core. An electromagnetic coil is stored in annular grooves formed in the first and second cores, and wound on the coil bobbin.

A center hole, or aperture, is formed in the circular plate second core of the magnetic excitor. This center hole, and the open end of the armature located radially inside of the coil bobbin, oppose the side force of the bearing member across an annular gap in the axial direction.

The conventional electromagnetic spring clutch of such a construction is assembled and utilized in the copier's paper-feed mechanism. Rotation of the clutch is restricted by engagement of the magnetic excitor to a stopper-pin protruding from the fixed housing. A gear part of second rotary member meshes with the gear on the drive side. When the drive side rotates, the second rotary member, coil spring, and armature rotate on the first bearing part of the first rotary member.

When the electromagnetic coil is energized under such conditions, magnetic flux flows through the first and second cores, while the bearing member and armature are magnetically attracted or suctioned into the bearing member which causes it to be stopped or braked. In this manner, the coil spring is wound around the spring wind-up parts of the first and second rotary member because of the rotation of the second rotary member. Therefore, under such magnetic excitation conditions, or energization of the coil, the drive side rotation is transmitted to the driven rotary shaft. When the electromagnetic coil is not energized, the rotation-transmission to the driven rotary shaft is cut off because braking of the armature is released.

Japanese Laid-open Patent No. 63-293327 and Laid-open Utility Model No. 63-187729 also explain such an armature-braking-type electromagnetic spring clutch.

The armature-driven-type electromagnetic spring clutch is also conventional and part of the prior art. In general, in the armature-braking-type electromagnetic spring clutch, an armature rotates along the bearing member of the magnetic excitor. The rotation of the excitor is restricted by a fixed housing, which is made of ferro-magnetic materials. Therefore, the wear particles generated by the bearing member's frictional engagement with the armature interfere with long-duration maintenance of stable operation of the electromagnetic spring clutch.

Japanese Laid-open Patent No. 63-293328 proposes an armature-driving-type electromagnetic spring clutch that solves this wear problem. That is, the noncylindrical surface, which is the outer peripheral surface of the first rotary member, is formed between the spring wind-up part and the third bearing part and a circular plate rotor. A similarly shaped center hole is formed in the fitting surface, and is press-fitted to the fitting surface. The armature is magnetically attracted to the rotating rotor by the magnetic flux of the electromagnetic coil. As a result of this attraction, the coil spring is wound up on the spring wind-up parts of the first and second rotary members for transmission of the rotation of the driving side rotary shaft to the second rotary member. The armature-driving-type electromagnetic spring clutch can maintain stable operation for a long duration compared to the armature-braking-type electromagnetic spring clutch when used in the copier paper-feed mechanism, because the load on the driving-side second rotary member is light and generation of wear particles due to rotor-armature frictional engagement is less.

In the conventional electromagnetic spring clutch, the bearing parts of second rotary member and magnetic excitor contact the first rotary member, which is formed of a nonmagnetic material, such as synthetic resin. The bearing parts that support the armature are along both the first and second rotary member. The armature-driving-type electromagnetic spring clutch thus has a construction in which a rotor is press-fitted onto the outer peripheral surface of the first rotary member. However, such a construction needs to be improved in order to offer the device at a lower cost because the bearing member contacts the magnetic excitor in the conventional electromagnetic spring clutch.

Also, improvement of the armature-driving-type electromagnetic spring clutch is necessary because its axial length is too long due to the axial annular gap formed between the bearing member of the magnetic excitor and rotor. In addition, the outer size of the magnetic excitor of this type of electromagnetic spring clutch is too large in general because the pair of lead wires are taken outside from the inside of the magnetic excitor by individually connecting the start and the end of the winding of the electromagnetic coil to the lead wire, so that the construction needs improvement in order to reduce the size.

The present invention is directed to an improvement over the described conventional electromagnetic spring clutches.

SUMMARY OF THE INVENTION

One objective of the present invention is to offer a compact, inexpensive armature-driving-type electromagnetic spring clutch that can maintain stable operation for a long duration by solving this problem. In order to achieve this objective, the electromagnetic spring clutch of the present invention includes a rotary shaft 2, a first nonmagnetic rotary member 4 fixed about the shaft. The first rotary member has an outer peripheral surface radially spaced from the shaft with the outer peripheral surface being spaced from the shaft by a gradually increasing distance from a first end of the first rotary member to a second end of the first rotary member in the axial direction.

The first rotary member includes a first cylindrical bearing portion 4b, a cylindrical spring wind-up part 4c, a second cylindrical bearing portion 4d, a cylindrical magnetic flux routing part 6, and a third bearing portion 4e formed in sequence from the first end.

A second nonmagnetic rotary member 7 is fitted about the first bearing portion 4b of the first rotary member 4. The second rotary member has an outer peripheral surface radially spaced from the first bearing portion with the outer peripheral surface being spaced from the first rotary member by a gradually increasing distance from a first end to a second end of the second rotary member in the axial direction, The second nonmagnetic rotary member includes a cylindrical spring wind-up portion 7a adjacent to the spring wind-up part 4c, a cylindrical fourth bearing portion 7b that has an outer diameter which is the same as that of the second bearing portion 4d, and a fifth bearing portion 7c having an outer diameter which is the same as that of the third bearing portion 4e, formed in sequence on the outer peripheral surface of the second rotary member.

A coil spring 8 is fitted across spring wind-up parts of the first rotary member and the second rotary member. The coil spring 8 has a first end of which is engaged with the second rotary member. A cylindrical armature 9 is located radially outside of the coil spring 8. The armature 9 engages a second end of the coil spring. One open end of the armature is supported by a fourth bearing portion 7b of the second rotary member. The armature has a second open end axially spaced from the magnetic flux routing part 6 of the first rotary member across a first annular gap.

A first magnetic core 11 is fitted to the third bearing portion 4e of the first rotary member. The first core 11 extends radially outside the magnetic flux routing part 6 of the first rotary member. The first core 11 has a cylindrical magnetic pole part 11b radially outside of the magnetic flux routing part 6 across a second annular gap.

A second magnetic core 12 is fitted to the fifth bearing portion 7c of the second rotary member and extends radially outside of the open end of the armature. The second core 12 has a cylindrical magnetic pole part 12c radially outside of the open end of the armature. A magnetic excitor 10 has an annular magnetism insulating zone that extends between axially opposing cylindrical magnetic poles 11b, 12c and radially outside of the armature. The excitor has an annular groove surrounded by the first and second cores and by the magnetism insulating zone. An electromagnetic coil is located in the annular groove of the magnetic excitor.

In one or more embodiments, the magnetic flux routing part is a nonmagnetic annular rotor fixed integrally by insert molding to the first rotary member and made of synthetic resin. Additionally, a coil bobbin having the electromagnetic coil wound thereon is stored in the annular groove 15c of the magnetic excitor. A wear particle storage area 15b is located within the magnetism insulating zone and is integrally formed on the internal peripheral surface of the coil bobbin.

In one or more embodiments, the magnetic excitor includes a first core 11 having a circular plate 11a. A cylindrical magnetic pole part 11b is bent in the axial direction from the inside of the circular plate and formed by press-machining of a magnetic steel plate. A second circular plate 12a is formed opposite the first plate across the electromagnetic coil.

A second core 12 has a cylindrical part 12b with a tip that is axially bent from outside of the circular plate 12a and is fitted onto the peripheral surface of the circular plate 11a of the first core. The cylindrical magnetic pole part 12c is axially bent from the inside of the annular coil 14. A portion of the first and second cores extends from the inside of the circular plate 12a to the magnetic pole part 12c formed as a corner with the corner having a cross section in a concave arc. The magnetic pole part 12c has an outer peripheral wall with a cross section of decreasing diameter towards the tip being formed into a corner of a convex arc shape.

In one or more embodiments, the magnetic excitor includes a coil bobbin 13 with a coil holding part 15 having the electromagnetic coil formed in an annular groove 15a that opens radially to the outside of coil 14. A coil cover 19 has a cylindrical part that covers the coil holding part of this coil bobbin. A terminal storage part 17 extends radially outward from one flange of this coil holding part 15. An extension part 20 extends radially outward from this cylindrical part and protrudes outward from the core and covers the back side of the terminal storage part.

A pair of terminals 16d are stored in a terminal storage part 17 of the coil bobbin 13. A pair of lead wires 22 are connected to the start 14a and the end 14b of the winding of the electromagnetic coil and are electrically connected to these terminals through contact with a conducting core wire. An insulation cover 21 is sandwiched between the extension part of the coil cover and the terminal cover.

A pinch-holding part 16b with a slit 16a into which said lead wire 22 enters and contacts a conducting core wire. A pin-terminal part 16d extended along the center line of the slit 16a and on which end the electromagnetic coil is wound and the pin-terminal part protruding outward from the terminal storage part of the coil bobbin.

BRIEF DESCRIPTION OF THE DRAWINGS

FIG. 12 (a) is a plan view of the terminal; 12(b) is a right-hand side view of the terminal; 12(c) is a front view of the terminal.

FIG. 13(a) is a cross-sect on view of an alternative embodiment of the rotor; 13(b) is a plan view of the embodiment of FIG. 13(a).

DETAILED DESCRIPTION OF THE DRAWINGS

The electromagnetic spring clutch shown in drawings is explained below as a mode of implementation of this invention.

Figure 1:
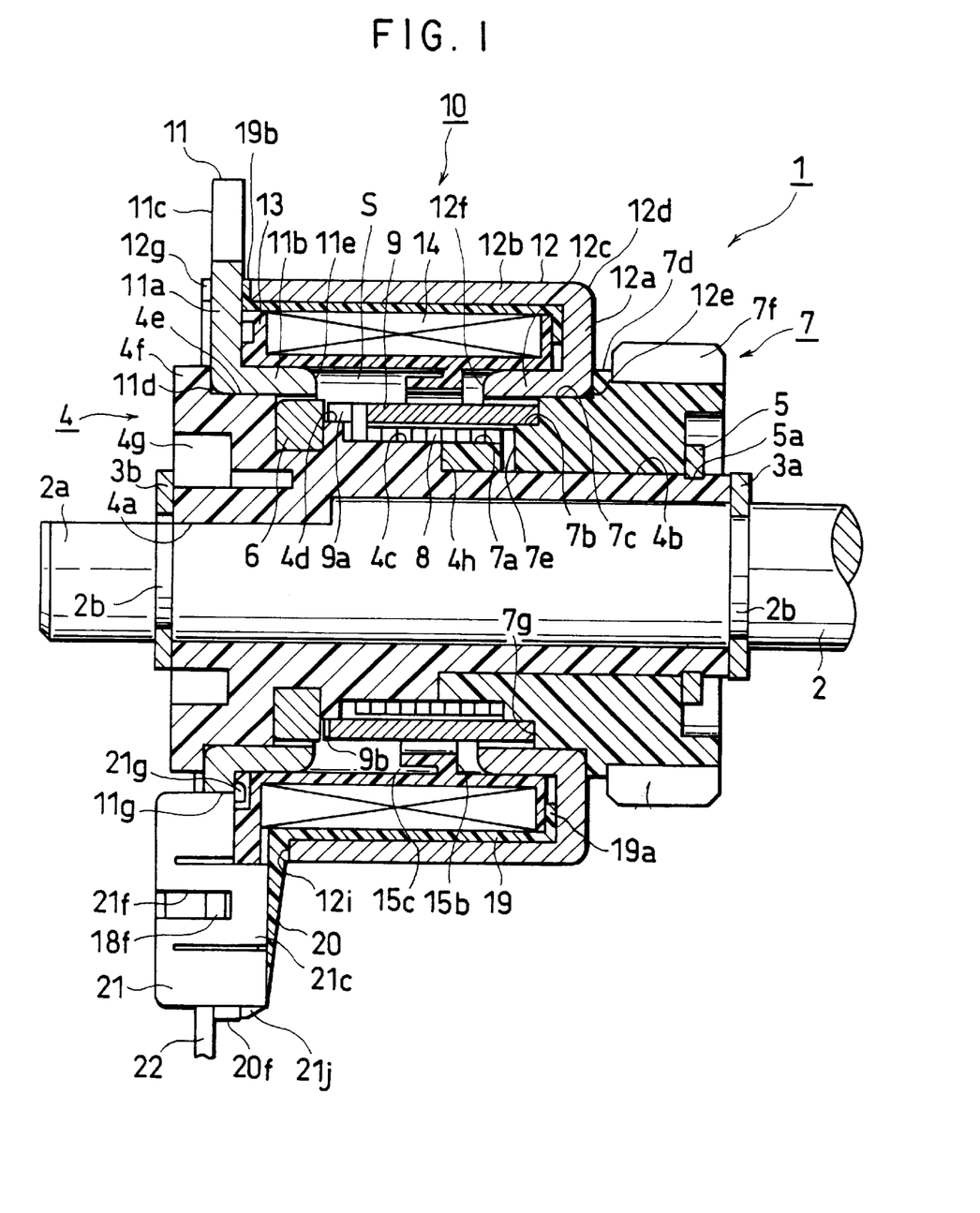
FIG. 1 is a cross-sectional view of the electromagnetic spring clutch of the present invention.

The electromagnetic spring clutch is mounted on the driving side of the rotary shaft 2 of a copier's paper-feed mechanism and is used as a device that transmits or cuts off the rotation of the driving side to the driven side rotary shaft on which the paper-feed ruler is mounted. End 2a of rotary shaft 2 is formed in a noncylindrical shape (e.g. it has cross section which is shaped as a letter D). A pair of stopper grooves 2b holds snap rings 3 (3a–3b) which prevent axial movement of the electromagnetic spring clutch mounted from the side of the shaft and 2a.

Rotary shaft 2 is inserted into the shaft hole of the first rotary member 4 in which fitting part 4a. A noncylindrical portion of the shaft hole is fitted to shaft 2a. The first rotary member 4 is made of a nonmagnetic synthetic resin and its outer peripheral surface becomes larger gradually starting from its axial end (the end butted onto snap ring 3a) toward the other end (the end stopped by snap ring 3b).

Provided on the other peripheral surface of the first rotary member 4 are the first cylindrical bearing part 4b, in which stopper groove for snap ring 5 is formed; cylindrical spring wind-up part 4c with a larger outer diameter than that of the first bearing part 4b; second bearing part 4d with a larger outer diameter than that of the spring wind-up part 4c; and, third cylindrical bearing part 4e with a larger outer diameter than that of the second bearing part 4d. Also, an annular flange 4f with a larger outer diameter than that of the third bearing part 4e is formed as the end on the side of the third bearing part 4e. Incidentally, the concave groove shown as 4g is provided for weight reduction of the first rotary member 4 and for other purposes.

Figure 13:
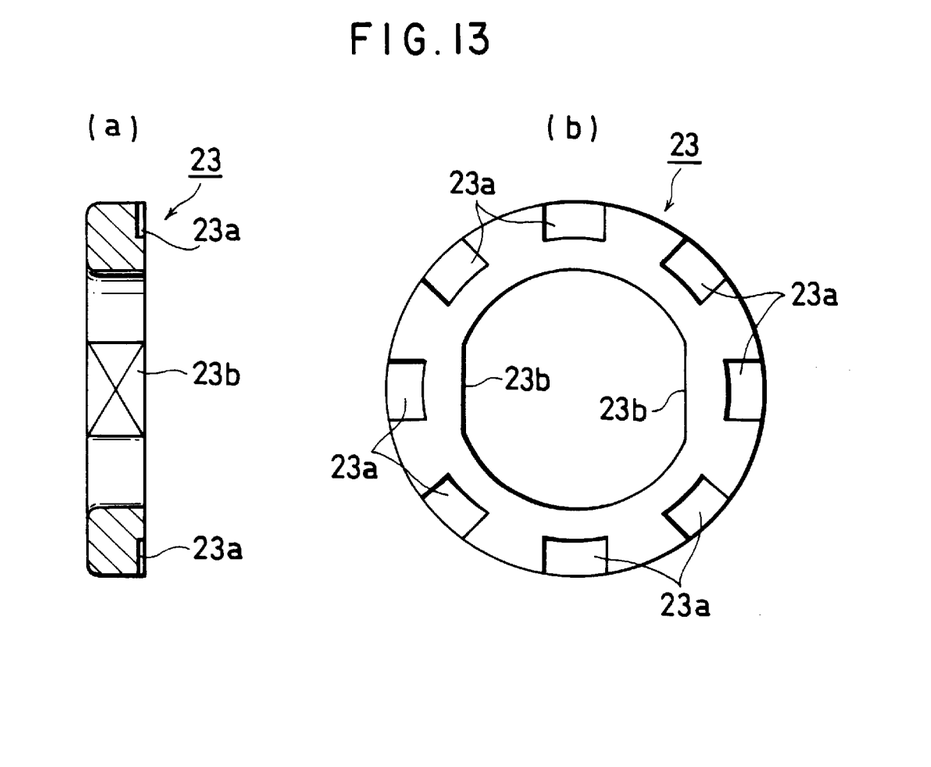

In addition, ring-shaped rotor 6, which is made of a magnetic material, is provided as a magnetic flux routing part and is attached to this first rotary member 4. This rotor 6 is integrally fixed to first rotary member 4 by insert-molding. The outer diameter of the cylindrical outer surface is slightly larger than the outer diameter of the second bearing part 4d. The shape of rotor 6 is a shape which has an inner peripheral surface with opposing flat surfaces, similar to the other rotor 23 shown in FIG. 13.

The first rotary member 4 of this shape rotatably supports the second rotary member 7 made of nonmagnetic synthetic resin. The second rotary member 7 is stopped by the snap ring while butting against wall 4h that moves from the first bearing part 4b to the spring wind-up part 4c. Its outer surface becomes large gradually from the axial end (the end that butts against wall 4h) to the other end (the end stopped by snap ring 5).

Provided on the other surface of the second rotary member 7 is a cylindrical spring wind-up part 7a with slightly larger outer diameter than that of spring wind-up part 4c of the first rotary member 4; the fourth cylindrical bearing part 7b with the same outer diameter as that of the second bearing part 4d of the first rotary member 4; cylindrical fifth bearing part 7c, which has the same outer diameter as that of the third bearing part 4e of the first rotary member 4; and, an annular flange 7d with an outer diameter larger than that of the said fifth bearing part 7c. Formed in spring wind-up part 7a is a through-hole 7e, in which one end of the coil spring 8 (described later) engages. In addition, formed on the outer surface of the side of the other end is a gear 7b, which meshes with a gear not shown. Coil spring 8 is fitted across spring wind-up part 7a of the second rotary member 7 and spring wind-up part 4c of the said rotary member 4.

One end of coil spring 8 is engaged in through-hole 7e of the second rotary member 7 and the other end of coil spring 8 is engaged in a cut-out part 9a, which is formed on the side of one open end of armature 9. In the magnetically nonexcited condition, with the energizing of electromagnetic coil 14 cut off, a small annular gap (not shown) is formed between the inner surface of coil spring 8 and the outer surface of spring-wind-up surface 4c of the first rotary member 4.

Armature 9 has one of its open ends supported by second bearing part 4d of the first rotary member 4 and its other open end supported by the fourth bearing part 7b of the second rotary member 7. The armature is a cylindrical member made of a magnetic material. Multiple concave grooves 9b are formed intermittently in the circumferential direction in one of its open ends in addition to cut-out 9a. This concave groove 9b is a groove that opens on the radial inner and on the outer sides and on the side of the rotor. As explained in Japanese Laid-Open Patent No. 55-50211, for example, it is provided to prevent accumulation of wear particles on the frictional engagement surface between armature 9 and rotor 6. The open end and its surface on the side of rotor 6 of this armature 9 are opposite to each other in the axial direction across the first annular gap when its other open end contacts wall 7g that moves from the fourth bearing part 7b of the second rotary member 7 to fourth bearing part 7c.

Figure 2:
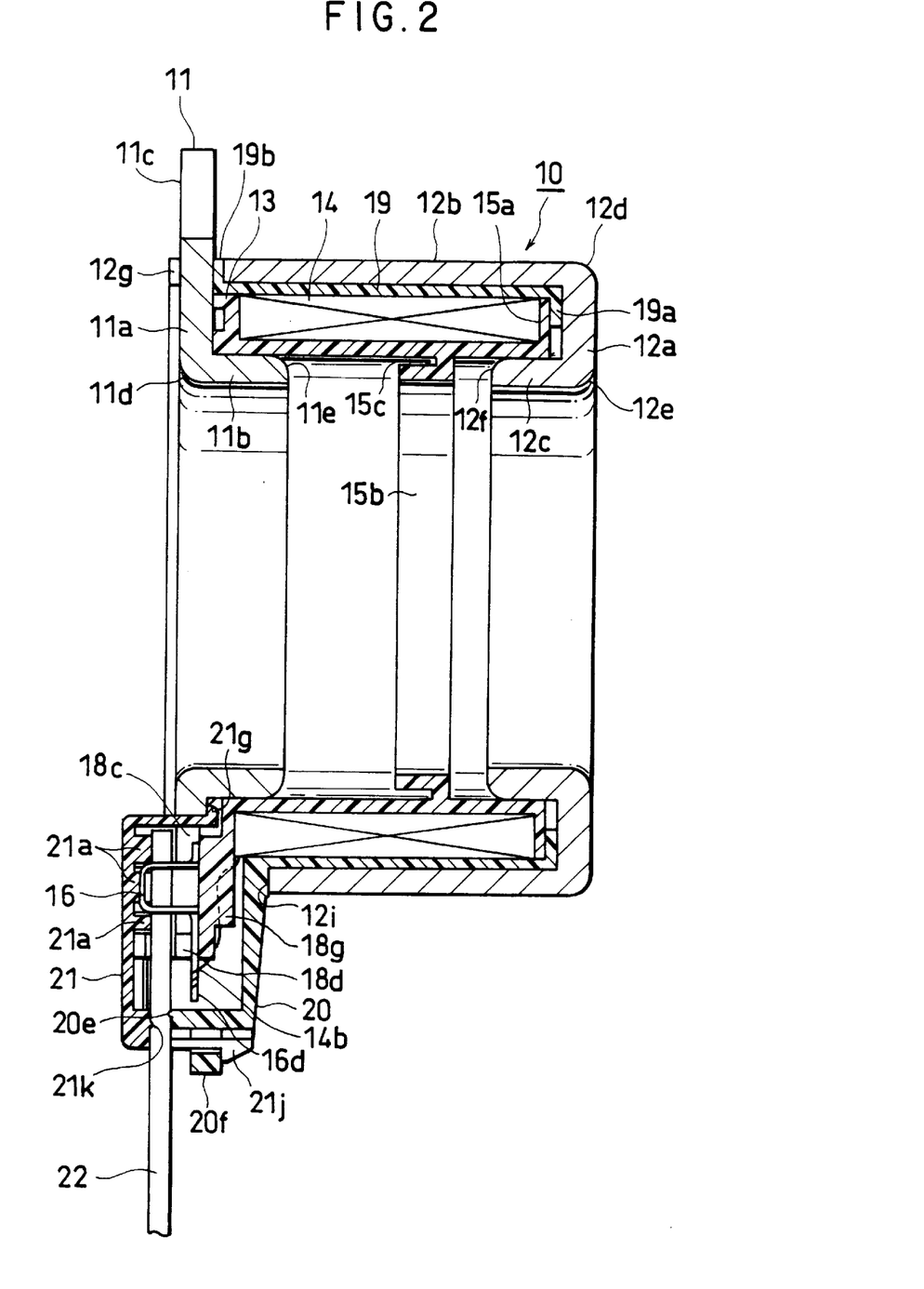
FIG. 2 is sectional view along line A—A of FIG. 3, showing the magnetic excitor of the clutch of FIG. 1.
Figure 3:
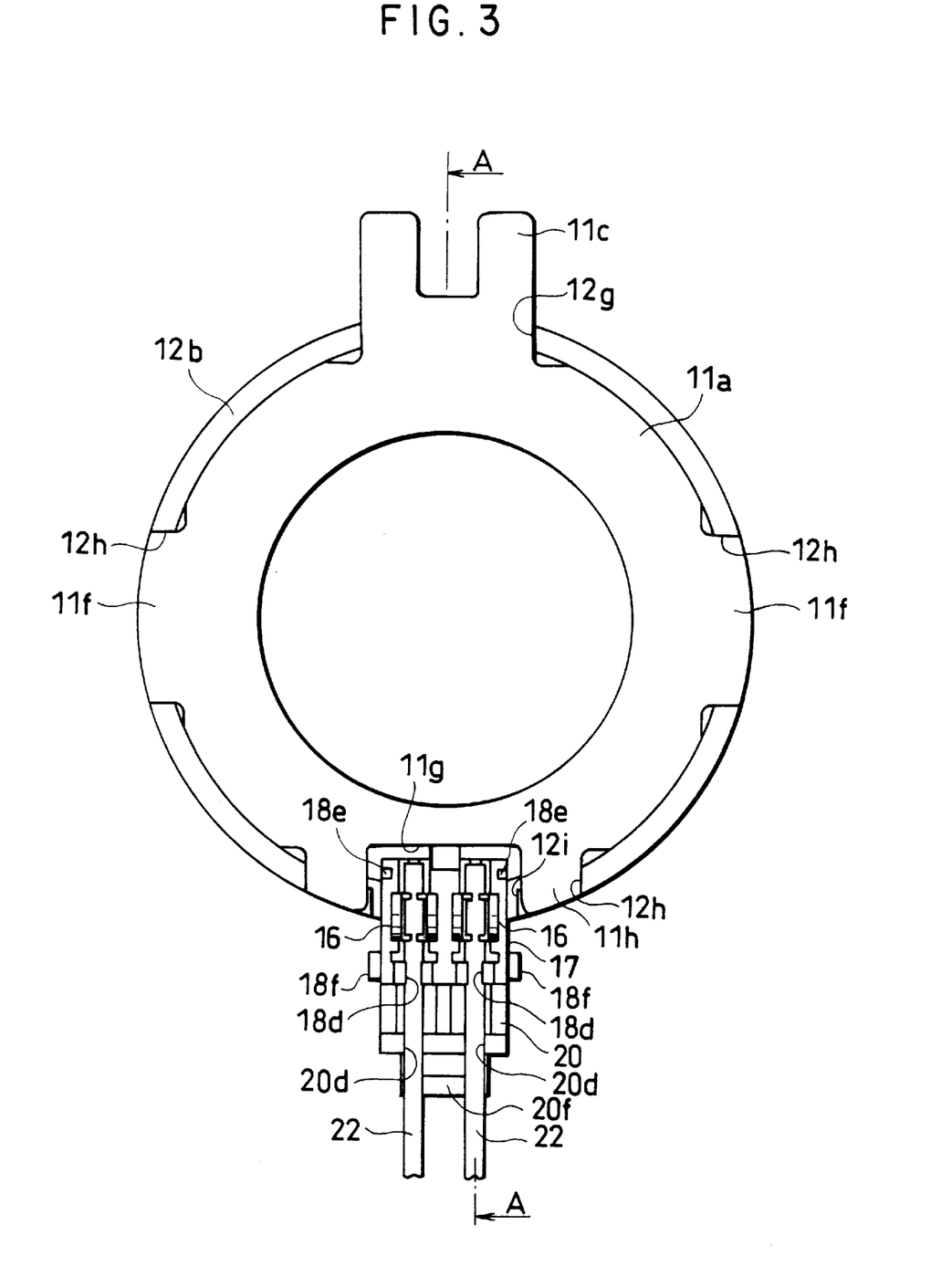
FIG. 3 is the left-hand side view of FIG. 2, which is the frontal view of the magnetic excitor with the terminal cover removed.

Next, the magnetic excitor 10 is explained. The magnetic excitor 10 has a first core 11 and a second core 12 which are draw-formed by press machining of a magnetic steel plate. The first core 11 is an annular member composed of circular plate 11a, cylindrical magnetic pole part 11b, which is axially bent from the inside of circular plate 11a, and flange part 11c, which extends radially outward from the outside of circular plate 11a. The cross section of the part between circular plate 11a and the magnetic pole part 11b is formed into a convex-arc corner 11d and tip outer wall with a cross section that becomes smaller toward the tip of magnetic pole part 11b, which is formed into a convex-arc corner 11e. In addition, on the outer surface of circular plate 11a, a pair of projections 11f that protrude radially outward and arc-shaped projection 11h with a °-shaped cut-out 11g to which terminal storage 17 to be mentioned later, coil bobbin 13, are fitted.

The second core 12 is an annular member composed of a circular plate 12a which opposes circular plate 11a of the first core 11 in the axial direction; a cylindrical part 12b, which is bent from the outside of circular plate 12 and the tip of which is fitted to the outer surface of circular plate 11a of the second core 11; and, a cylindrical magnetic pole part 12c, which is bent axially from the inside of circular plate 12a. The portion between circular plate 12a and cylindrical part 12b and the portion between circular plate 12a and magnetic pole part 12c are formed into corners 12d and 12e with convex-arc-shaped cross sections.

The tip outer wall of magnetic pole part 12c is formed into a convex-arc-shaped corner, the cross section of which decreases toward the tip. Provided at one tip of cylindrical part 12b, are cut-out 12g, to which arc-shaped projection 19b (described later), coil core 19 and flange 11c of the first core 11 are fitted; a cut-out 12h, to which a pair of projections 11f of circular plate 11a of the first core 11 and projection 11h are fitted; and, cut-out 12i, to which extension 20 of the coil 19 to be described later, are fitted, are formed.

The first core 11 and second core 12 of this shape are fitted to and supported by the third bearing part 4e of the first rotary member 4 and fifth bearing part 7c of the second rotary member 7. Also, the tip of magnetic pole part of 11b of the first core 11 is extended radially outside rotor 6 when it is fitted to the third bearing part 4e and is butted against flange 4f. A second annular gap is formed between its inner surface and the outer surface of rotor 6. In addition, the tip of the magnetic pole part 12c of the second core 12 extends radially outward to the open end of armature 9 when it is fitted to the fifth bearing part 7c and butted against flange 7d. A third annular gap 3 is formed between its inner surface and the outer surface of armature 9. A space between these axially opposing magnetic pole parts 11b and 12c and radially outside of armature 9 is provided as an annular magnetism-insulating zone S for routing the magnetic flux. Corners 11e–12f of the first core 11 and second core 12 are formed by bending the tips of the magnetic pole parts 11b–12c to the inside and in the axial direction and the bent parts are cut off in the manufacturing process of cores 11–12.

Figure 4:
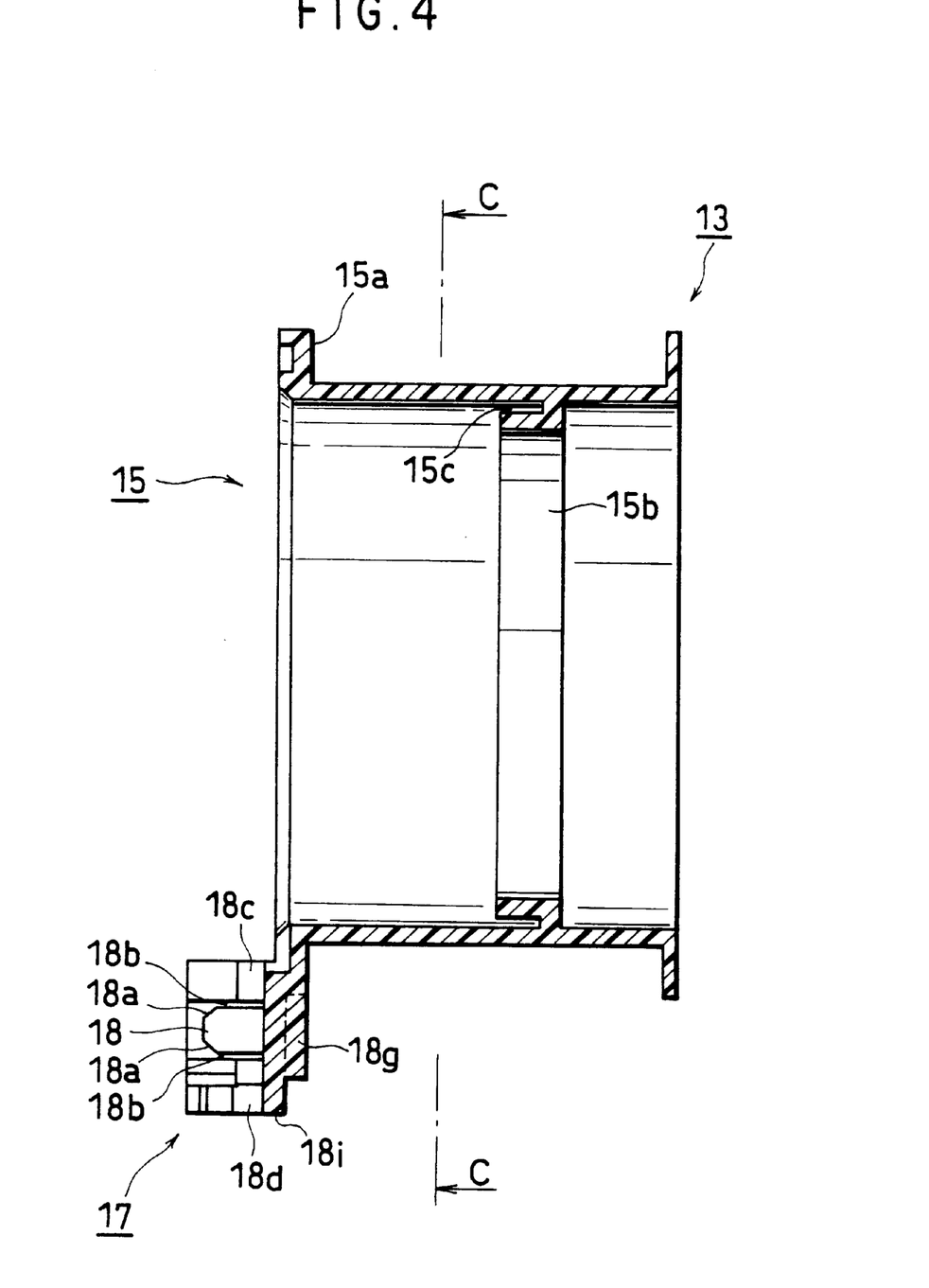
FIG. 4 is a sectional view along line B—B of FIG. 5, showing only the coil bobbin of FIG. 2.
Figure 5:
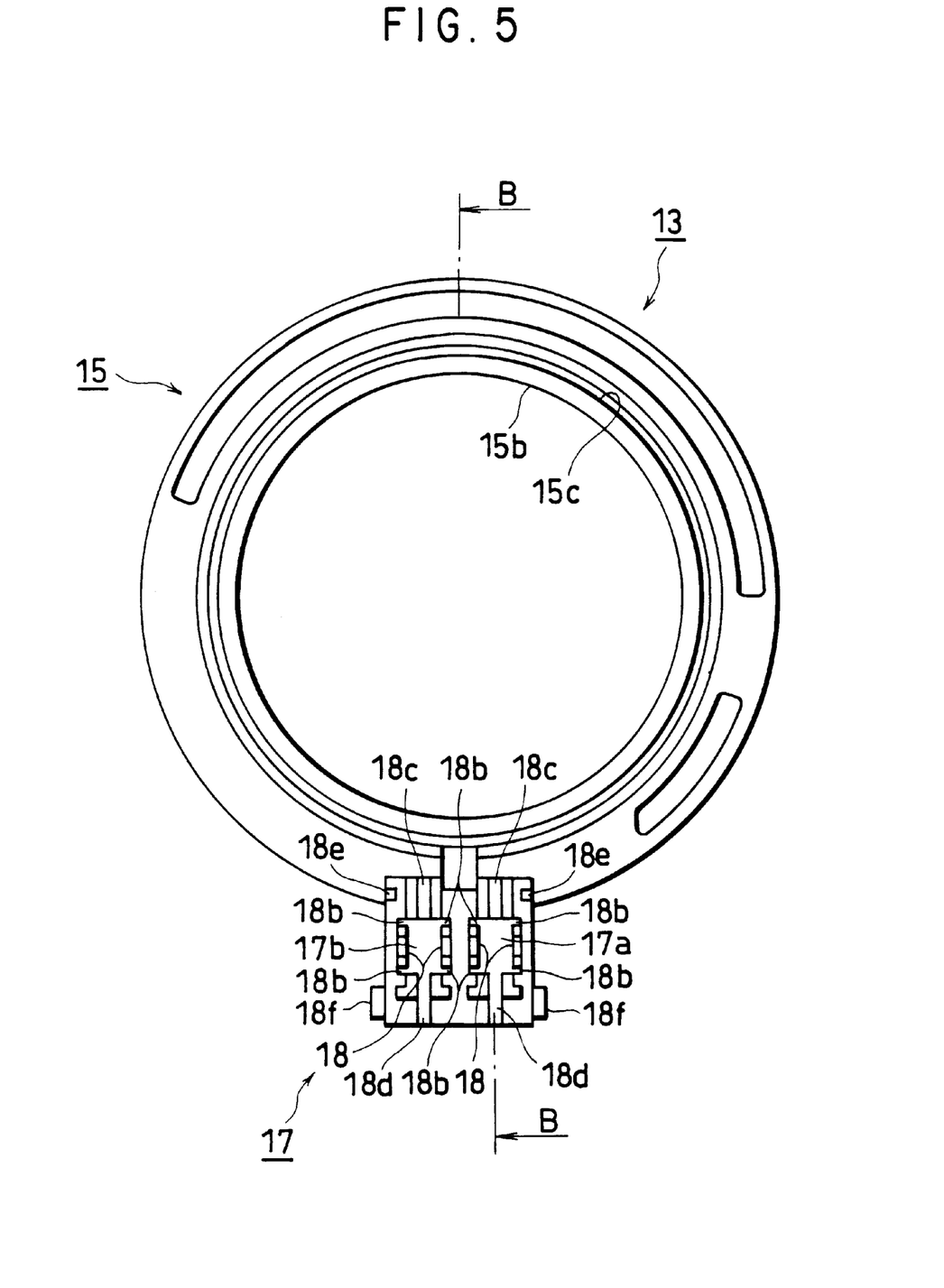
FIG. 5 is the left-hand side view of FIG. 4, which is a front view of the coil bobbin.
Figure 6:
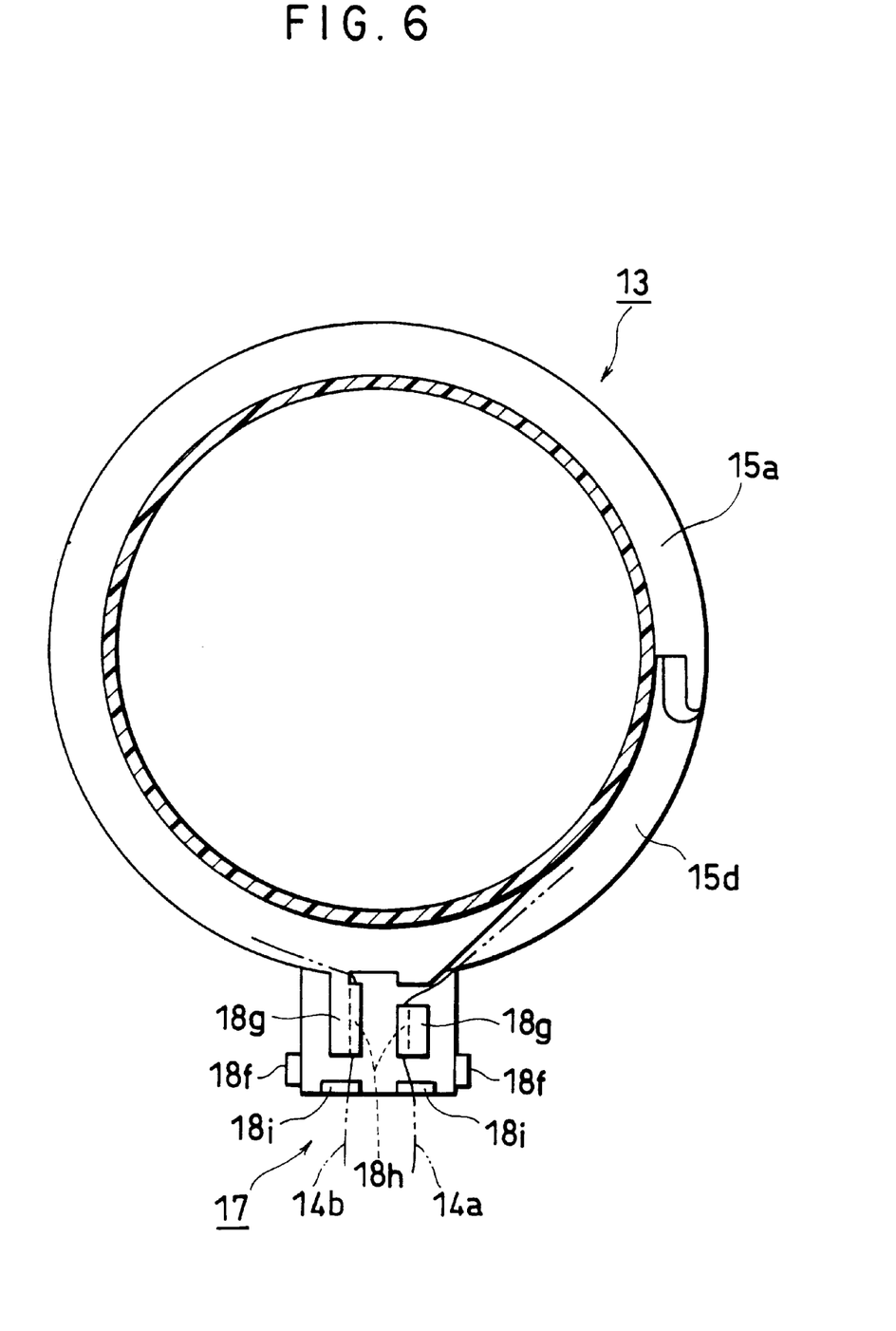
FIG. 6 is a sectional view along line C—C of FIG. 4, which is the cross-section of the coil bobbin.

An electromagnetic coil 14 is wound on coil bobbin 13 and stored in the annular groove surrounded by first and second cores and magnetism insulating zone S. Coil bobbin 13 is made of synthetic resin and in the shape as shown FIGS. 4, 5 and 6. That is, coil holding part for electromagnetic coil 14 and terminal storage 17, which stores said coil-holding part 15; and, a pair of terminals 16, that electrically connect coil-end 14b, coil start 14a to lead wire 22, are provided to coil bobbin 13.

Coil-holding part 15 has annular groove 15a that opens radially outside of electromagnetic coil 14 and wear-particle storage 15b, surrounded by an annular wall integrally formed on the inner surface of the said coil holding part formed in it. Wear particle storage 15b is located in magnetism-insulating zone S of magnetic excitor 10 and its annular groove 15c opens to the first gap between armature 9 and rotor 6. In a flange of this coil-holding part 15, thin-walled part 15d (see FIG. 6) is formed, on which the start end 14a of the electromagnetic coil 14 is wound. The terminal storage part 17 that extends radially outward is integrally formed in it.

Terminal storage 17 has a pair of terminal press-in chambers 17a–17b at a left to right interval. Provided at the inner wall of terminal press-in chambers 17a–17b are a pair of guide walls 18 in a shape with tapered corners 18a (see FIG. 4) at both top ends and at terminal insertion groove 18b, formed at the four corners of each terminal press-in chambers 17a–17b which are between the guide wall 18 and inner wall, are provided. On the wall, on the radial inside and outside of terminal press-in chambers 17a–17b, terminal retention groove 18c and terminal lead-out groove 18d formed concentrically are produced.

Also, at the left and right of the radial inside of the outer wall of terminal storage 17, a pair of concave grooves 18e are formed, to which projection 21 of the terminal cover to be mentioned later is fitted. On the left and right side of the radial outside, a pair of projections 18f are formed. These are engaged to through-hole 21f of terminal cover 21 to be mentioned later. In addition, in the back face of terminal storage 17, a pair of guide parts 18g (see FIG. 6) are provided, with which the start and end (14a and 14b) of the electromagnetic coil 14 come into contact, when the coil start 14a and coil end 14b are let out. These guide parts are formed at intervals. On the opposing side face of each guide part 18g, fitting groove 18h is formed; this deepens toward the front. As shown by the 2-dot broken line, start 14a and end 14b of electromagnetic coil 14 pass fitting groove 18h and are led out from tapered surface 18i to the pair-terminal 16d to be mentioned later.

Figure 7:
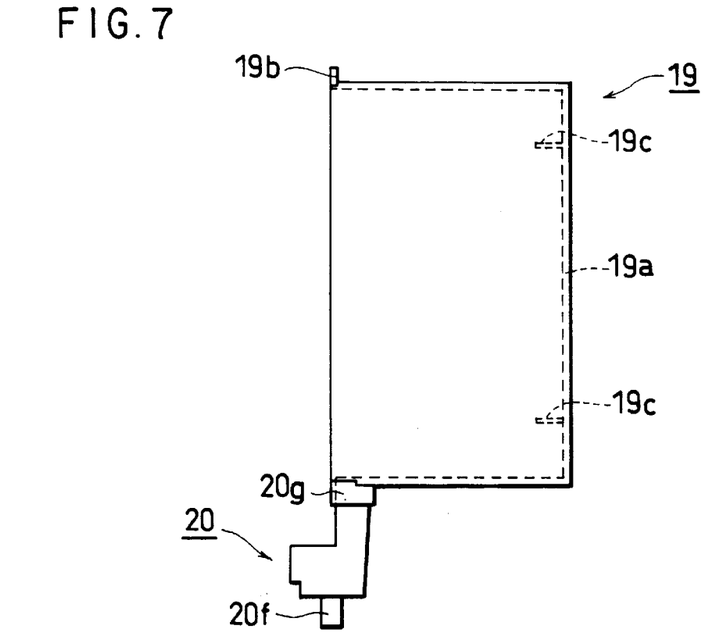
FIG. 7 is a side view of the coil cover, which is the right-hand view of FIG. 8.
Figure 8:
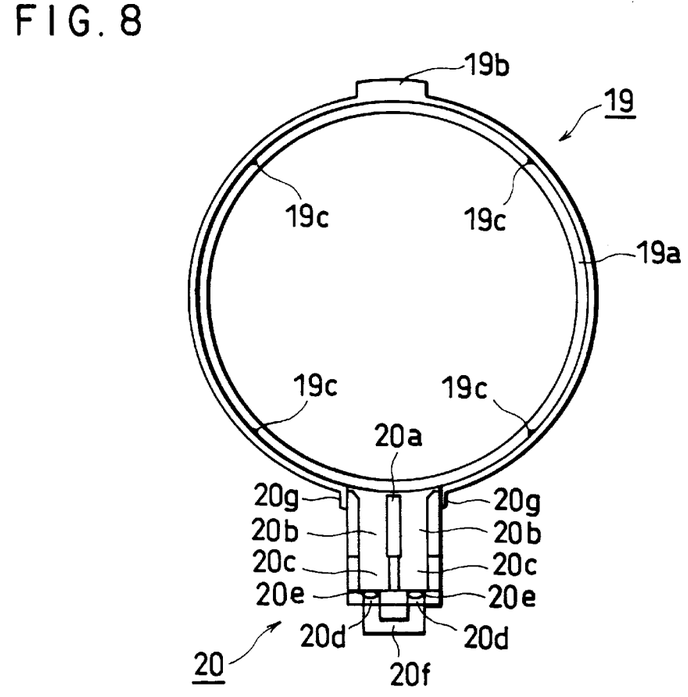
FIG. 8 is the left-hand view of FIG. 7, which is a front view of the coil cover.

The outside of coil bobbin 13 of this shape is covered by coil cover 19 shown in FIGS. 7 and 8. Coil cover 19 is of a cylindrical shape and is made of synthetic resin. At its one open end, annular flange 19a is provided in the radial direction, butted against the outside of the flange of coil bobbin 13. At the other open end, radially outward facing arc-shaped projection 19b that is fitted to the cut-out 12g of the second core 12 and radially outward extending extension 20 that covers the back face of terminal storage 17 of coil bobbin 13 are formed.

Multiple projections shown by coil 19c are pressed into the flange outer surface of coil bobbin 13. Extension 20 has bulkhead 20a that is fitted between a pair of guide parts 18g formed in the terminal storage 17 of coil bobbin 13, and concave part b, divided by bulkhead 20a cover guide part 18g in the back face of terminal storage 17 from which start 14a and end 14b of the electromagnetic coil 14 are led out.

Extension 20 is provided with the following: a pair of storage 20c of star pin terminal 16d of terminal 16 to be mentioned later, onto which end 14b and start 14a of electromagnetic coil 14 are wound; a pair of half-arc-shaped grooves 20d, onto which lead wire 22 is fitted; as well as projection 20e for stopping lead wire to form in each groove 20d. In addition, on the radial outside of extension 20, engagement part 20f with through-hole for engagement of the stopper-piece 21j of terminal core 21 to be mentioned later is provided. Face part of extension 20 shown by 20g is fitted to cut out 12i of the second core 12.

Figure 9:
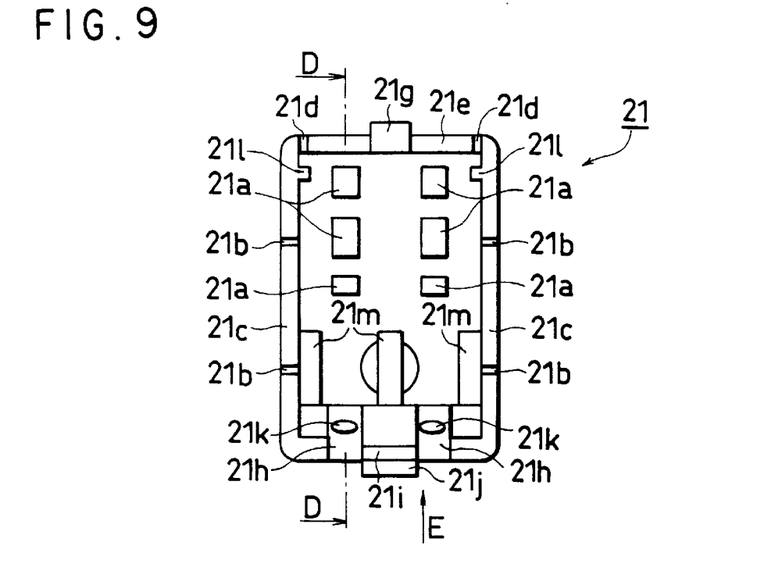
FIG. 9 is the back side of the terminal cover, which is the right-hand side view of FIG. 10.
Figure 10:
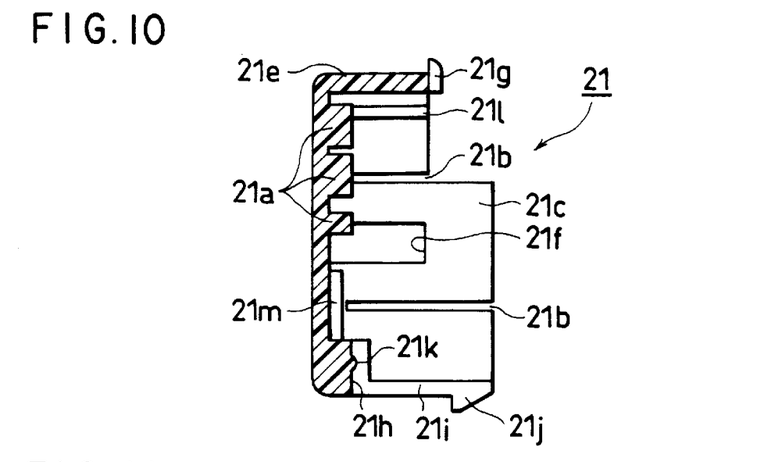
FIG. 10 is a sectional view along line D—D of FIG. 9.
Figure 11:
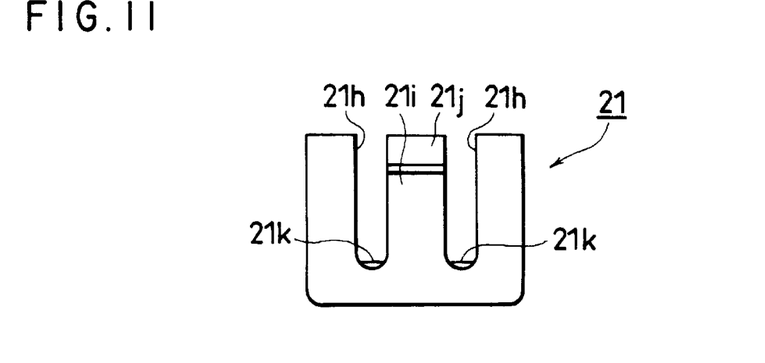
FIG. 11 is a side view of FIG. 9 along arrow E.

Next, the shape of terminal cover 21 which covers extension 20 of coil cover 19 is explained. Terminal cover 21 is made of synthetic resin and its shape is shown in FIGS. 9–11. That is, multiple protruding pressed parts 21a which overlap terminal press-in chamber 17a–17b of coil bobbin 13 are formed on its bottom on the inside for retention of lead wire 22, electrically connected to terminals 16 which will be mentioned later.

The stepped wall, which is the long left-to-right opposing side in FIG. 9, is divided by a pair of slits 21b and the part between slits 21b is made with an elastically deformable engagement part 21c. In addition, in the wall which is the left-to-right opposing upper short side in FIG. 9, an elastically deformable engagement part 21e is made with a pair of slits 21d. Projection 18f provided to terminal storage 17 of coil bobbin 13 is engaged with a through-hole 21f in engagement part 21c, and engagement piece 21g provided to the tip of engagement part 21e, engages with cut-out 11g of the first core 11.

In the wall which is the lower short side of terminal cover 21, an elastically deformable engagement part 21i is formed by a pair of grooves 21h, to which lead wire 22 is fitted. Engagement piece 21j provided to the tip of engagement part 21 engages with engagement part 20f provided at the extension 20 of coil cover 19. Projection 21k for stopping lead wire 22, is formed at the bottom of groove 21h. The rod-like projection indicted by code 21l is a convex part which fits into concave groove 18e provided at terminal storage 17 of coil bobbin 13. In addition, the projection shown by code 21m is in a reinforcing rib.

Next, the shape of terminal 16, made of conducting material, is explained. Terminal 16 is provided with a °-shaped pinch-holding part 16b in which a stepped slit 16a is formed for pressing-in of the lead wire 22. The center line of slit 16a is provided with a rod-like holding pin 16c, extending from one wall of the pinch-holding part 16b and a rod-like pin-terminal extending from the other wall. A pressed rib 16e is formed in pin-terminal 16d. In the corner of the side wall, projection 16f is formed, that enters into a wall inside terminal-engagement groove 18b, which is provided to terminal press-in chambers 17a–17b of coil bobbin 13.

Magnetic excitor 10, composed of parts of such shape, is assembled as follows. In a coil assembly composed of electromagnetic coil 14, coil bobbin 13, terminal 16 and lead wire 22, an electromagnetic coil 14 is wound on annular groove 15a of coil-holding part 15 of coil bobbin 13, while the start-end of 14a is pulled out.

Next, while the ends of electromagnetic coil 14 are pulled out, a pair of terminals 16 are pressed into terminal storage 17 of coil bobbin 13. Pinch-holding part 16b of terminal 16 is held in terminal press-in chambers 17a–17b because projection 16f enters into the wall of terminal engagement groove 18b. Holding pin 16d of terminal 16 protrudes to the outside of terminal storage 17 from terminal guiding groove 18d, while holding pin 16c of terminal 16 is held in terminal-holding groove 18c. To the pair of protruding pin-terminals 16d, start 14a and end 14b of electromagnetic coil 14, which are pulled out from coil-holding part 15 through tapered surface 18i and fitting groove 18h of guide part 18g are attached by soldering. Lead wire 22 is pressed into slit 16a of pinch-holding part 16b of terminal 16, and its insulation is broken to provide electrical connection of the conducting core wire to terminal 16.

Coil cover 19 is placed on the coil assembly 13 thus assembled. Bulkhead 20a is fitted between a pair of guide parts 18g and extension 20 of coil cover 19 on the back of terminal 17 of coil bobbin 13 is placed on it. Projection 19c of coil cover 19 is pressed into flange part of the coil holding part 15 of bobbin 13. Lead wire 22 is fitted to groove 20d of extension 20 of coil cover 19. Next, terminal cover 21 is placed at the front face of terminal storage 17 of coil bobbin 13. Projection 18f of terminal storage 17 is engaged with through-hole 21f. The connector part of lead wire 22 is held in slit 16a of terminal 16 by pressed part 21a of terminal cover 21, and projection 21k inside groove 21h of terminal cover 21 enters into the insulation cover for attachment. After placement of coil cover 19 and terminal cover 21, the coil assembly 13 is covered by first core 11 and second core 12 and the open end of the cylindrical core part 12b of the second core 12 is pressed into the outer surface of circular plate 11a of the first core 11.

When the electromagnetic coil 14 of the electromagnetic spring clutch of such construction is energized while rotary shaft 2, first rotary member 4 and rotor 6 attached to the first rotary member 4, are rotating, the magnetic flux is routed from magnetic pole 11b of the first core 11 to rotor 6 via the second gap, from rotor 6 to armature 9 through the first gap, and from armature 9 to magnetic pole 12c of the second core 12 via the third gap. For this reason, armature 9 is magnetically enclosed in rotor 6 and rotates with it. Now, coil spring 8, are wound on spring wind-up parts 4c–7a, so that the first rotary member 4 and the second rotary member 7 rotate as a unit. When the energizing of the electromagnetic core 14 is stopped by such magnetic excitation condition, the magnetic flux disappears and armature 9 separates from rotor 6. Therefore, coil spring 8 returns by itself because of its elasticity and the inner surface of coil spring 8 separates from the spring wind-up surface 4c of the first rotary member 4, so that transmission of rotation from the first rotary member 4 to the second rotary member 7 is cut off.

During the repetition of such an operation, frictional engagement between armature 9 and rotor 6 generates wear particles. However, compared to the armature-driving-type electromagnetic spring clutch without antiwear particle measure, the safety operation can be maintained for a longer duration because the wear particles are made to enter into multiple concave groove 9b and these concave grooves 9b are provided at the open end of armature 9. Also, the wear particles are made to enter into annular grooves 15c of wear particle storage part 15b of coil bobbin 13. Incidentally, in this mode of implementation of this invention, multiple concave grooves 9b are provided to armature 9 but provision of multiple concave grooves can be made to either one of the frictional engagement surfaces of armature 9 or rotor 6.

Figure 12:
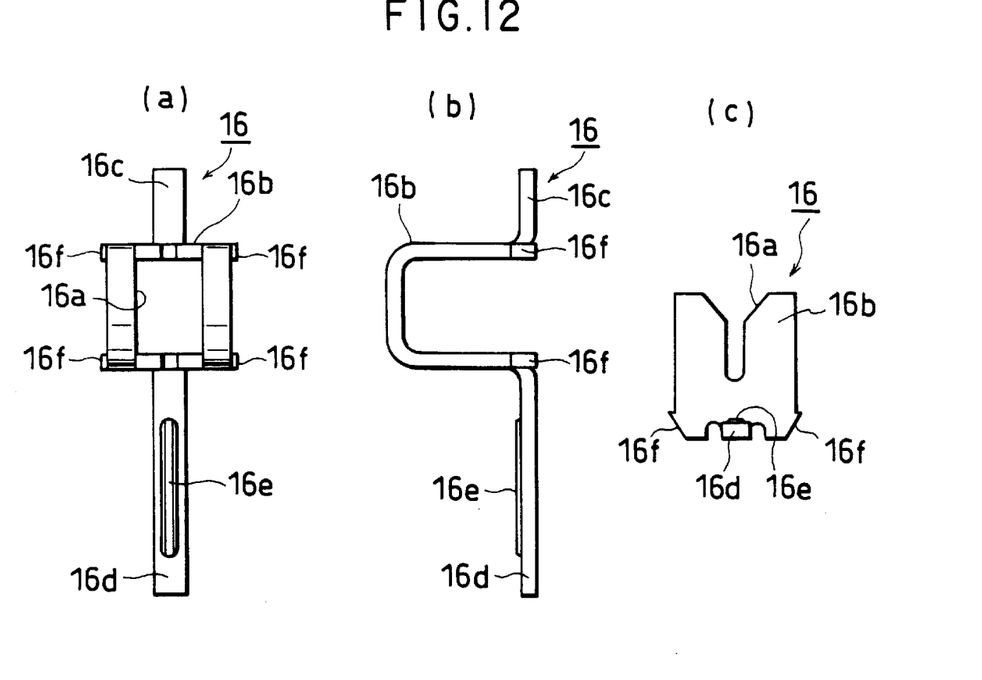

FIG. 12 shows rotor 23 with multiple concave grooves 23a and opposing flat surfaces 23b are formed on its inner surface. When rotor 23 is used instead of rotor 6, formation of concave grooves 9b at the open end of armature 9 is not necessary. In the electromagnetic spring clutch 1 explained above, the first rotary member 4 and second rotary member 7 are made of synthetic resin, but the rotary members can also be made of nonmagnetic metallic material. In addition, the ring-like rotor can be fitted with a key to the second bearing part 4d of the first rotor member 4 and butted against the side face of the third bearing part 4e.

The electromagnetic spring clutch of this invention includes the magnetic pole part, which is fitted to the third bearing part of the first rotary member and extends to the radial outside of the magnetic-flux-routing part of the second rotary member, and opposing cylindrical magnetic pole parts are fitted to the fifth bearing part of the second rotary member and which extend to the outside radially to the open end of armature across annular third gap from the armature. The magnetic excitor is supported by the first rotary member and second rotary member, so that there is no axial gap between the magnetic excitor and rotor as in a conventional electromagnetic spring clutch. Therefore, the dimensions in the axial direction can be reduced, provision of a bearing member to the magnetic excitor is not necessary and an inexpensive electromagnetic spring clutch can be offered by this invention.

Also, in the electromagnetic spring clutch of this invention, a rotor is attached to the first rotary member, made of synthetic resin material by insert-molding so that the problem of the conventional electromagnetic spring clutch caused by press-fitting of the rotor, i.e. deformation of the shaft hole of the first rotary member made of synthetic resin and the resulting difficult insertion of the rotary shaft, can be solved. In addition, in the electromagnetic spring clutch according to this invention, a wear particle storage is provided in the coil bobbin in the magnetism insulation—zone of the magnetic excitor, so that it can be of a relatively large size. Therefore, the problem of defective operation due to wear particles can be solved.

Also, in the electromagnetic spring clutch of this invention, the corner of the first core, which is fitted to the third bearing part of the first rotary member, the corner of the tip of the magnetic pole part of the first core to which the coil-holding part of the coil bobbin is fitted, corner of second core fitted to the 5 bearing part of second rotary member, and the corner of the tip of the magnetic pole part of the second core, to which the coil-holding part of the coil bobbin is fitted, are made to have a convex arc shape, respectively, so that the assembly fitting work is simplified. Also, the problem of defective operation due to damage of the third bearing part of the first rotary member or fifth bearing part of the second rotary member can be solved.

Also, in the electromagnetic spring clutch according to this invention, the terminal storage that protrudes outward from the core is provided to the coil bobbin and the start and end of the electromagnetic coil are connected to lead wires at the outside of the magnetic excitor, so that the outer diameter of the magnetic excitor can be reduced and the pinch-holding part with slit for connection of the lead wire and the pin terminals for connection of the ends of the electromagnetic coils are provided to the terminal that is pressed into the terminal storage of the coil bobbin so that the soldering work of the electromagnetic coil and the press-fusion work of the lead wire can be simplified.

What is claimed is:

1. An electromagnetic spring clutch, comprising:

a rotary shaft (2), a first nonmagnetic rotary member (4) fixed about said shaft (2), said first rotary member having an outer peripheral surface radially spaced from said shaft, said outer peripheral surface being spaced from said shaft by a gradually increasing distance from a first end of said first rotary member to a second end of said first rotary member in an axial direction, said first rotary member including a first cylindrical bearing portion (4b), a cylindrical spring wind-up part (4c), a second cylindrical bearing portion (4d), a cylindrical magnetic flux routing part (6), and a third bearing portion (4e) formed in sequence from said first end, a second nonmagnetic rotary member (7) fitted about said first bearing portion (4b) of said first rotary member (4), said second rotary member having an outer peripheral surface radially spaced from said first bearing portion, said outer peripheral surface being spaced from said first rotary member by a gradually increasing distance from a first end of said second rotary member to a second end of said second rotary member in the axial direction, said second nonmagnetic rotary member including a cylindrical spring wind-up portion (7a) adjacent to said spring wind-up part (4c), a cylindrical fourth bearing portion (7b) having an outer diameter which is the same as that of said second bearing portion (4d), and a fifth bearing portion (7c) having an outer diameter which is the same as that of said third bearing portion (4e), formed in sequence on the outer peripheral surface of said second rotary member, a coil said spring (8) fitted across spring wind-up part (4c) of said first rotary member and said cylindrical wind-up portion (7a) of said second rotary member, said coil spring (8) having a first end of which is engaged with said second rotary member, a cylindrical armature (9) which is located radially outside of said coil spring (8), said armature (9) engaging a second end of said coil spring, one open end of said armature being supported by said fourth bearing portion (7b) of said second rotary member, said armature having a second open end axially spaced from said magnetic flux routing part (6) of said first rotary member across a first annular gap, a first magnetic core (11) fitted to said third bearing portion (4e) of said first rotary member, said first core (11) extending radially outside said magnetic flux routing part (6) of said first rotary member, said first core (11) having a cylindrical magnetic pole part (11b) radially outside of said magnetic flux routing part (6) across a second annular gap, a second magnetic core (12) fitted to said fifth bearing portion (7c) of said second rotary member and extending radially outside of said open end of said armature, said second core (12) having a cylindrical magnetic pole part (12c) radially outside of said open end of said armature, a magnetic excitor (10) having an annular magnetism insulating zone extending between said axially opposing cylindrical magnetic poles (11b, 12c) and radially outside of said armature, said excitor (10) having an annular groove surrounded by said first and second cores and said magnetism insulating zone, and an electromagnetic coil located in said annular groove of said magnetic excitor.

2. The electromagnetic spring clutch of claim 1 wherein said magnetic flux routing part is a nonmagnetic annular rotor fixed integrally by insert molding to said first rotary member and made of synthetic resin.

3. The electromagnetic spring clutch of claim 1 wherein a coil bobbin having said electromagnetic coil wound thereon is stored in said annular groove (15c) of said magnetic excitor and a wear particle storage area (15b) located within said magnetism insulating zone is integrally formed on the internal peripheral surface of said coil bobbin.

4. The electromagnetic spring clutch of claim 1 wherein said magnetic excitor further comprises:

said first core (11) having a circular plate (11a), said cylindrical magnetic pole part (11b) being bent in the axial direction from the inside of said circular plate and formed by press-machining of a magnetic steel plate, a second circular plate (12a) opposite said first plate and positioned across said electromagnetic coil, and said second core (12) having a cylindrical part (12b) with a tip that is axially bent from outside of said circular plate (12a) and is fitted onto the peripheral surface of the circular plate (11a) of the first core, said cylindrical magnetic pole part (12c) being axially bent from the inside of said annular coil (14), a portion of said first and second cores extending from inside of said circular plate (12a) to said magnetic pole part (12c) formed as a corner, said corner having a cross section in a concave arc, said magnetic pole part (12c) having an outer peripheral wall with a cross section of decreasing diameter towards the tip being formed into a corner of a convex arc shape.

5. The electromagnetic spring clutch of claim 4 wherein said magnetic excitor further comprises:

a coil bobbin (13) with a coil holding part (15) having said electromagnetic coil formed in an annular groove (15a) that opens radially to the outside of coil 14, a coil cover (19) having a cylindrical part that covers said coil holding part of said coil bobbin, a terminal storage part (17) that extends radially outward from one flange of said coil holding part (15), and an extension part (20) that extends radially outward from said cylindrical part and protrudes outward from said core and covers a back side of said terminal storage part, a pair of terminals (16d) stored in a terminal storage part (17) of said coil bobbin (13), a pair of lead wires (22) being connected to the start (14a) and the end (14b) of the winding of said electromagnetic coil and electrically connected to said terminals through contact with a conducting core wire, and an insulation cover (21) sandwiched between the extension part of said coil cover and said terminal cover.

6. The electromagnetic spring clutch of claim 5 wherein a pinch-holding part (16b) has a slit (16a) into which said lead wire (22) enters and contacts a conducting core wire, a pin-terminal part (16d) extends along the center line of said slit (16a) and on which end the said electromagnetic coil is wound, and said pin-terminal part protruding outward from said terminal storage part of said coil bobbin.

* * * * *